(12) United States Patent
Brüls

(10) Patent No.: US 6,687,297 B2
(45) Date of Patent: Feb. 3, 2004

(54) VIDEO ENCODING

(75) Inventor: Wilhelmus Hendrikus Alfonsus Brüls, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 387 days.

(21) Appl. No.: 09/773,154

(22) Filed: Jan. 31, 2001

(65) Prior Publication Data

US 2001/0017888 A1 Aug. 30, 2001

(30) Foreign Application Priority Data

Feb. 1, 2000 (EP) .............................................. 00200332

(51) Int. Cl.[7] .............................. H04B 1/66; H04N 7/12
(52) U.S. Cl. .................................................. 375/240.14
(58) Field of Search ....................... 375/240.01, 240.16, 375/240.17, 240.28, 240.14, 240.13, 240.19; 382/236; 348/401.1; H04N 7/12; H04B 1/66

(56) References Cited

U.S. PATENT DOCUMENTS 5,594,504 A * 1/1997 Ebrahimi ............... 375/240.16
6,081,622 A * 6/2000 Carr et al. ................... 382/236
6,118,823 A * 9/2000 Carr ....................... 375/240.28
6,597,739 B1 * 7/2003 Li et al. ................. 375/240.19
2002/0136301 A1 * 9/2002 Yoneyama et al. ..... 375/240.13

OTHER PUBLICATIONS

Vince Rhee et. al., Block–Level Refinement of Motion Description in Layered H.261 Video, p. 1408–1412, 1996 IEEE, Proceeding of ASILOMAR–29.*
Yuxo Senda, Approximate Criteria for the MPEG–2 Motion Estimation, vol. 1, No. 3, Apr. 2000, IEEE.*

* cited by examiner

Primary Examiner—Chris Kelly
Assistant Examiner—Tung Vo

(57) ABSTRACT

To efficiently use space capacity and to provide accurate motion vectors for P-pictures, a two-pass search in a P-coding mode of an MPEG encoder is run so that the second pass refines the precision of motion vectors found in the first pass. Within a frame encoding period, the first pass coincides with the time interval used by a known MPEG video encoder in encoding B-pictures to search forward motion vectors with respect to a prior image, and, within the frame encoding period, the second pass coincides with searching backward motion vectors with respect to a subsequent image.

6 Claims, 2 Drawing Sheets

| | I1 | P4 | B2 | B3 | P7 | B5 | B6 | P10 |
|---|---|---|---|---|---|---|---|---|
| 83 | - | a | a \| b | a \| b | b | b \| a | b \| a | a |
| 84 | a | b | - | - | a | - | - | b |

| | I1 | P4 | B2 | B3 | P7 | B5 | B6 | P10 |
|---|---|---|---|---|---|---|---|---|
| 83 | - | a \| a' | a \| b | a \| b | b \| b' | b \| a | b \| a | a \| a' |
| 84 | a | b | - | - | a | - | - | b |

VIDEO ENCODING

FIELD OF THE INVENTION

The invention relates to a video encoder and a method of predictively encoding images with reference to one reference image in a first prediction mode and to two reference images in a second prediction mode.

BACKGROUND OF THE INVENTION

Predictive video encoders as defined in the opening paragraph are generally known. For example, the MPEG video compression standard provides a first prediction mode in which images are encoded with reference to a previous image of the sequence. Thus, encoded images are referred to as P-pictures. The previous image may be an autonomously encoded I-picture or another P-picture. The MPEG standard also provides a second prediction mode in which images are encoded with reference to a previous image as well as a subsequent image of the sequence. Thus, encoded images are referred to as B-pictures. They are more efficiently encoded than P-pictures.

Motion compensation is usually applied to the respective reference images. To this end, the known video encoders include a motion estimation circuit which searches motion vectors representing motion between the input image and respective reference image(s). In the first (P) prediction mode, the motion estimation circuit is used for searching forward motion vectors representing motion between input image and previous image. In the second (B) prediction mode, the motion estimation circuit is used in a first interval of the frame encoding period for searching forward motion vectors representing motion between input image and previous image, and in a second interval of said frame encoding period for searching backward motion vectors representing motion between input image and subsequent image.

OBJECT AND SUMMARY OF THE INVENTION

It is an object of the invention to further improve the video encoder.

To this end, the video encoder in accordance with the invention is characterized in that the motion estimation circuit is arranged to use the first interval of the frame encoding period in the first (P) prediction mode to search motion vectors representing motion between an input image and said one reference image, and to use the second interval of said frame encoding period to refine the motion vectors found in the first interval.

The motion estimation circuit of the prior-art video encoder executes the motion vector search twice within a frame encoding period in the second (B) prediction mode. One run, or pass, of the search process is used to generate the forward motion vectors, another run is used to generate the backward motion vectors. In the first (P) prediction mode, forward motion vectors need to be searched only. The invention is based on the recognition that the motion estimator can be used a second time in the P-prediction mode so as to further refine the search for forward motion vectors. It is achieved with the invention that the motion vectors associated with P-pictures are more precise than the motion vectors associated with B-pictures. This is attractive because P-pictures are generally wider apart from each other than B-pictures.

In an embodiment of the encoder, in which the motion estimation circuit is arranged to search a motion vector from among a plurality of given candidate motion vectors, said candidate motion vectors in the second interval are formed by predetermined variations of the motion vector found in the first interval.

DESCRIPTION OF EMBODIMENTS

Figures 1, 2, 3:
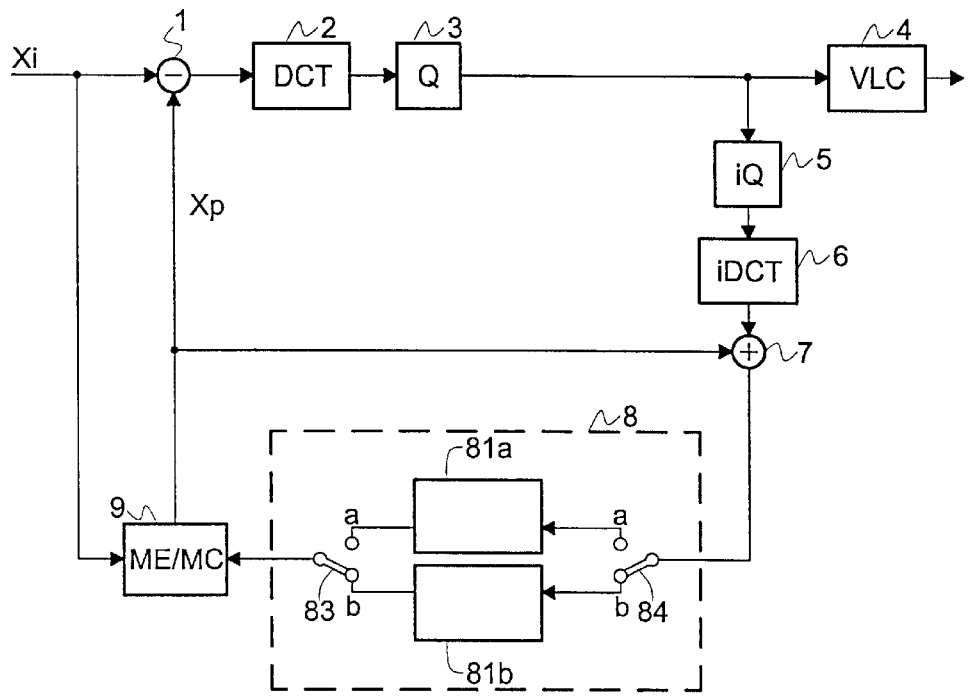
FIG. 1 shows a schematic diagram of a video encoder in accordance with the invention.
FIG. 2 shows a diagram to illustrate a prior-art operation of the video encoder.
FIGS. 3 and 4A–4C show diagrams to illustrate the operation of the video encoder in accordance with the invention.

The invention will now be described with reference to an MPEG video encoder. However, the invention is not restricted to encoders complying with the MPEG standard. FIG. 1 shows a schematic diagram of the encoder in accordance with the invention. The general layout is known per se in the art. The encoder comprises a subtracter 1, an orthogonal transform (e.g. DCT) circuit 2, a quantizer 3, a variable-length encoder 4, an inverse quantizer 5, an inverse transform circuit 6, an adder 7, a memory unit 8, and a motion estimation and compensation circuit 9.

The memory unit 8 includes memories 81a and 81b each having the capacity for storing a reference image. The memory unit further includes two switches 83 and 84. Switch 83 controls which one of the memories is read by the motion estimator. Switch 84 controls in which one of the memories the encoded image is stored. The switches are implemented as software-controlled memory-addressing operations in practical embodiments of the encoder.

As is generally known in the art of video coding, I-pictures are autonomously encoded without reference to a previously encoded image. Subtracter 1 is inoperative. The I-picture is locally decoded and stored in one of the memories 81a or 81b. P-pictures and B-pictures are predictively encoded with reference to a prediction image. To this end, the subtracter 1 subtracts a motion-compensated prediction image $X_p$ from the input image $X_i$, so that the difference is encoded and transmitted. Adder 7 adds the locally decoded P-picture to the prediction image so as to update the stored reference image.

FIG. 2 shows a timing diagram to summarize a prior-art operation of the encoder. The diagram shows the positions of switches 83 and 84 during consecutive frame periods for encoding an IBBPBBP . . . sequence. The frames are identified by encoding type (I, B, P) and display order. I1 is the first frame, B2 is the second frame, B3 is the third frame, P4 is the fifth frame, etc.

More particularly, FIG. 2 shows that the I-picture (I1) is written into memory 81a (switch 84 in position a). The first P-picture (P4) is predictively encoded with reference to the stored I-picture (switch 83 in position a), and written into memory 81b (switch 84 in position b). The subsequent P-pictures (P7, P10, . . . ) are alternately read from and written into the memories 81a and 81b.

B-pictures are encoded with reference to a previous and a subsequent I or P-picture. Note that this requires the encoding order of images to be different from the display order. Circuitry therefor is known in the art and not shown in the Figure. The motion estimation and compensation circuit 9 accesses both memories 81a and 81b to generate forward motion vectors (referring to the previous image) and backward motion vectors (referring to the subsequent image). To this end, the switch 83 switches between position a and position b. Said switching is shown on a frame-by-frame basis for simplicity. In practice, the switching is done at the macroblock level.

The motion estimation circuit executes a given motion vector search process. Said process requires reading of the respective memory for a given number of times, say N. As FIG. 2 clarifies, encoding of B-pictures requires 2N memory accesses per frame period. The same vector search process requires N memory accesses per frame in the P-encoding mode, whereas 2N accesses are available. This recognition is exploited by the invention. To this end, the motion vector search process is carried out in two passes for P-pictures. In the first pass, the motion vectors are found with a 'standard' precision. In the second pass, the same process is carried out to further refine the accuracy of the motion vectors that were found in the first pass. The two-pass operation is illustrated in FIG. 3, the refining pass being denoted by a' or b', as the case may be. Note again that the two-pass operation is carried out in practice on a macroblock-by-macroblock basis.

Figure 4A:
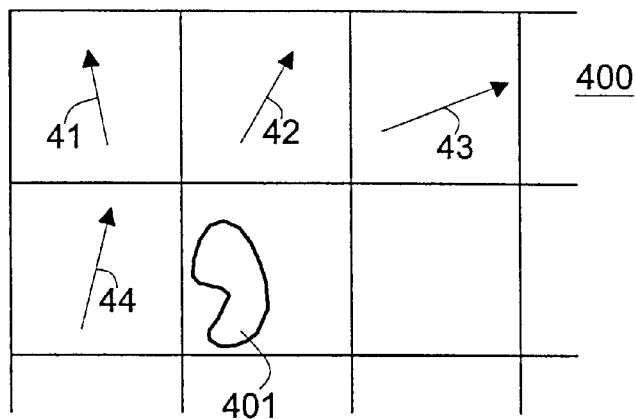
Figure 4B:
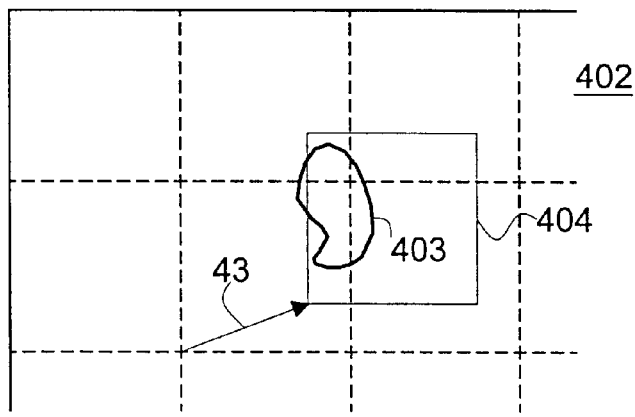
Figure 4C:
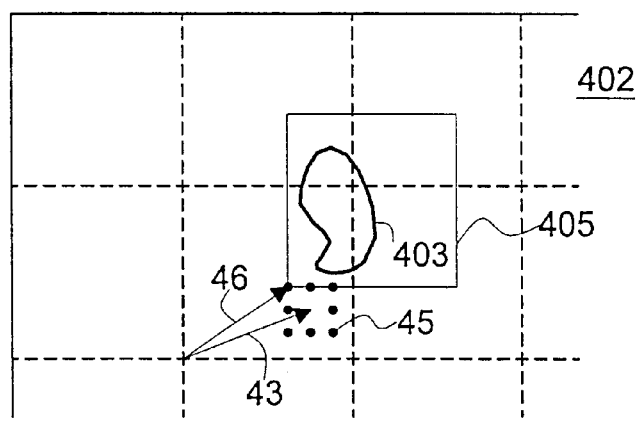

FIGS. 4A–4C show parts of an image to further illustrate the two-pass motion estimation process. FIG. 4A shows a current image 400 to be predictively (P) encoded. The image is divided into macroblocks. A current macroblock to be encoded includes an object 401. Reference numerals 41, 42, 43 and 44 denote motion vectors already found during encoding of neighboring macroblocks. FIGS. 4B and 4C show the previous I or P-picture 402 stored in one of the memories 81a or 81b, as the case may be. In the previous reference image, the object (now denoted 403) is at a different position and has a slightly different shape. In this example, the motion estimator searches the best motion vector from among a number of candidate motion vectors. Various strategies for selecting suitable candidate motion vectors are known in the art. It is here assumed that the motion vectors denoted 41, 42, 43 and 44 in FIG. 4A are among the candidate motion vectors for the current macroblock. FIG. 4B shows the result of the first motion vector search process pass. It appears that candidate motion vector 43 provides the best match between the current macroblock of the input image and an equally sized block 404 of the reference image.

In the second pass, the same search algorithm is applied with different candidate vectors. More particularly, the motion vector found in the first pass is one candidate motion vector. Other candidate vectors are further refinements thereof. This is illustrated in FIG. 4C, where 43 is the motion vector found in the first pass and eight dots 45 represent end points of new candidate motion vectors. They differ from motion vector 43 by one (or one-half) pixel. The same search algorithm is now carried out with the new candidate vectors. It appears in this example that block 405 best resembles the current macroblock. Accordingly, motion vector 46 is the motion vector which is used for producing the motion-compensated prediction image $X_p$. The two-pass operation for P-pictures is particularly attractive because it provides more accurate motion vectors for images that are wider apart than B-pictures.

The invention can be summarized as follows. A conventional MPEG video encoder searches forward motion vectors with respect to a previous image and backward motion vectors with respect to a subsequent image in order to provide a motion-compensated prediction image for encoding B-pictures. This requires 2N accesses to the memory in which said images are stored. Searching the motion vectors for P-pictures requires N memory accesses. The invention uses the spare capacity by running a two-pass motion vector search in the P-coding mode. In the second pass, the precision of the motion vectors found in the first pass is further refined. This provides more accurate motion vectors for P-pictures.

What is claimed is:

1. A video encoder for predictively encoding images with reference to one reference image in a first (P) prediction mode and to two reference images in a second (B) prediction mode, comprising a motion estimation circuit using a first interval of a frame encoding period in the second (B) prediction mode to search motion vectors representing motion between an input image and one of said two reference images, and using a second interval of said frame encoding period to search motion vectors representing motion between said input image and the other one of said two reference images; characterized in that the motion estimation circuit is arranged to use the first interval of the frame encoding period in the first (P) prediction mode to search motion vectors representing motion between an input image and said one reference image, and to use the second interval of said frame encoding period to refine the motion vectors found in the first interval.

2. A video encoder as claimed in claim 1, in which the motion estimation circuit is arranged to search a motion vector from among a plurality of given candidate motion vectors, said candidate motion vectors in the second interval being formed by predetermined variations of the motion vector found in the first interval.

3. A video encoder as claimed in claim 1 or 2, wherein said reference image in the first prediction mode is a previous image of a sequence of images, one of the reference images in the second prediction mode is a previous image of said sequence, and the other one of the reference images in the second prediction mode is a subsequent image of said sequence.

4. A method of predictively encoding images with reference to one reference image in a first (P) prediction mode and to two reference images in a second (B) prediction mode, comprising the steps of searching motion vectors representing motion between an input image and one of said two reference images in a first interval of a frame encoding period in the second (B) prediction mode, and searching motion vectors representing motion between said input image and the other one of said two reference images in a second interval of said frame encoding period, characterized by the steps of searching motion vectors representing motion between an input image and said one reference image in the first interval of the frame encoding period in the first (P) prediction mode, and refining the motion vectors found in the first interval in the second interval of said frame encoding period.

5. A method as claimed in claim 4, in which the step of searching a motion vector comprises selecting a motion vector from among a plurality of given candidate motion vectors, said candidate motion vectors in the second interval being formed by predetermined variations of the motion vector found in the first interval.

6. A method as claimed in claim 4 or 5, wherein said reference image in the first prediction mode is a previous image of a sequence of images, one of the reference images in the second prediction mode is a previous image of said sequence, and the other one of the reference images in the second prediction mode is a subsequent image of said sequence.

\* \* \* \* \*